(12) United States Patent
Picard

(10) Patent No.: US 9,197,467 B2
(45) Date of Patent: Nov. 24, 2015

(54) MULTIPLE PROTOCOL RECEIVER

(75) Inventor: Gilles Picard, Thiais (FR)

(73) Assignee: Itron, Inc., Liberty Lake, WA (US)

( * ) Notice: Subject to any disclaimer, the term of this patent is extended or adjusted under 35 U.S.C. 154(b) by 110 days.

(21) Appl. No.: 13/278,421

(22) Filed: Oct. 21, 2011

(65) Prior Publication Data

US 2013/0100867 A1    Apr. 25, 2013

(51) Int. Cl.
*H04B 7/00* (2006.01)
*H04L 27/00* (2006.01)
*H04L 29/06* (2006.01)

(52) U.S. Cl.
CPC ............ *H04L 27/0012* (2013.01); *H04L 69/22* (2013.01)

(58) Field of Classification Search
CPC .............................. H04W 4/00; H04L 27/0012
USPC .......................... 370/310, 319, 392, 445, 466
See application file for complete search history.

(56) References Cited

U.S. PATENT DOCUMENTS

| | | | |
|---|---|---|---|
| 5,506,863 A * | 4/1996 | Meidan et al. | ................ 375/134 |
| 6,342,844 B1 * | 1/2002 | Rozin | ........................... 340/933 |
| 6,406,074 B1 | 6/2002 | Mahaney | |
| 6,411,219 B1 | 6/2002 | Slater | |
| 6,914,950 B1 | 7/2005 | Luneau | |
| 6,987,444 B2 | 1/2006 | Bub et al. | |
| 7,065,125 B1 | 6/2006 | Miller et al. | |
| 7,460,621 B2 | 12/2008 | Lewis | |
| 7,583,197 B2 | 9/2009 | Wesby Van Swaay | |
| 7,729,329 B2 | 6/2010 | Fujita et al. | |
| 7,813,374 B2 | 10/2010 | Moorti et al. | |
| 7,924,764 B2 | 4/2011 | Moorti et al. | |
| 7,929,916 B2 * | 4/2011 | Picard | ............................. 455/69 |
| 7,953,190 B2 | 5/2011 | Patel et al. | |
| 7,956,767 B2 | 6/2011 | Ratiu et al. | |
| 8,094,010 B2 | 1/2012 | Wesby-van Swaay | |
| 2001/0017881 A1 | 8/2001 | Bhatoolaul et al. | |

(Continued)

FOREIGN PATENT DOCUMENTS

| | | |
|---|---|---|
| JP | 200351812 | 2/2003 |
| JP | 200448755 | 2/2004 |

(Continued)

OTHER PUBLICATIONS

PCT International Search Report for PCT International Application No. PCT/US2011/062798, search completed Feb. 9, 2012; report mailed Feb. 22, 2012.

(Continued)

*Primary Examiner* — Dang Ton
*Assistant Examiner* — Nourali Mansoury
(74) *Attorney, Agent, or Firm* — Lee & Hayes, PLLC

(57) ABSTRACT

The presently disclosed subject matter is directed to methods and apparatus for providing a multi-protocol receiver for use in a radio frequency (RF) network. The receiver is designed to listen for multiple different packet preambles in parallel and, upon detection of a particular preamble, shift to demodulating the data portion of the packet using the single modulation technique associated with the particular preamble. Transmission of packets may be performed using a single radio frequency for all network devices or by frequency hopping techniques but using the same hopping pattern for all network devices. The receiver may be used with general communications networks or more specific applications, such as Smart Grid and AMI networks, and meshed networks of metrology devices.

16 Claims, 3 Drawing Sheets

(56) References Cited

U.S. PATENT DOCUMENTS

| | | | |
|---|---|---|---|
| 2003/0147374 | A1 | 8/2003 | Chiu et al. |
| 2004/0110510 | A1 | 6/2004 | Jeon et al. |
| 2004/0192219 | A1 | 9/2004 | Malone et al. |
| 2004/0240486 | A1 | 12/2004 | Venkatesh et al. |
| 2005/0097122 | A1* | 5/2005 | Schafflutzel et al. ......... 707/102 |
| 2006/0109809 | A1 | 5/2006 | Kao et al. |
| 2006/0223468 | A1 | 10/2006 | Toms et al. |
| 2006/0223572 | A1 | 10/2006 | Hedin et al. |
| 2007/0058623 | A1 | 3/2007 | Moorti et al. |
| 2007/0064771 | A1* | 3/2007 | Schilling ...................... 375/133 |
| 2007/0153815 | A1 | 7/2007 | She et al. |
| 2007/0155423 | A1 | 7/2007 | Carmody et al. |
| 2007/0173202 | A1 | 7/2007 | Binder et al. |
| 2008/0002681 | A1 | 1/2008 | Bajic et al. |
| 2008/0074285 | A1 | 3/2008 | Guthrie |
| 2008/0089390 | A1 | 4/2008 | Picard |
| 2008/0117077 | A1 | 5/2008 | Ratiu |
| 2008/0118011 | A1 | 5/2008 | Trachewsky et al. |
| 2008/0233890 | A1 | 9/2008 | Baker |
| 2008/0272934 | A1 | 11/2008 | Wang et al. |
| 2008/0303661 | A1 | 12/2008 | Chick |
| 2009/0083817 | A1* | 3/2009 | Van Den Hoven et al. ... 725/116 |
| 2009/0243869 | A1 | 10/2009 | Sanderford, Jr. |
| 2009/0279587 | A1* | 11/2009 | Eriksson et al. .............. 375/133 |
| 2009/0310699 | A1 | 12/2009 | Kodama et al. |
| 2010/0109907 | A1 | 5/2010 | Sharma |
| 2010/0130245 | A1 | 5/2010 | Iseda |
| 2010/0278187 | A1 | 11/2010 | Hart et al. |
| 2011/0044395 | A1 | 2/2011 | Hansen et al. |
| 2011/0045875 | A1 | 2/2011 | Rhee et al. |
| 2011/0075614 | A1 | 3/2011 | Newkirk et al. |
| 2011/0110229 | A1 | 5/2011 | Himayat et al. |
| 2011/0182326 | A1 | 7/2011 | Picard |
| 2011/0204717 | A1* | 8/2011 | Shaffer ........................... 307/18 |
| 2012/0250729 | A1 | 10/2012 | Miller et al. |
| 2012/0320887 | A1* | 12/2012 | Chintalapudi et al. ........ 370/338 |

FOREIGN PATENT DOCUMENTS

| | | |
|---|---|---|
| JP | 2006246093 | 9/2006 |
| JP | 2011013765 | 1/2011 |
| JP | 2013500621 | 1/2013 |
| JP | 2013503589 | 1/2013 |
| JP | 2013051675 | 3/2013 |
| WO | WO 01/06759 A1 | 1/2001 |
| WO | WO106759 | 1/2001 |
| WO | WO 01/48490 | 7/2001 |
| WO | WO2004008719 | 1/2004 |
| WO | WO2008027457 | 3/2008 |

OTHER PUBLICATIONS

Written Opinion of the International Searching Authority for PCT International Application No. PCT/US2011/062798, opinion completed Feb. 9, 2012; date of mailing Feb. 22, 2012.
PCT International Search Report for PCT International Application No. PCT/US2011/062814, search completed Feb. 14, 2012; report mailed Mar. 2, 2012.
Written Opinion of the International Searching Authority for PCT International Application No. PCT/US2011/062814, opinion completed Feb. 14, 2012; date of mailing Mar. 2, 2012.
Oct. 23, 2012 Office Action issued in Canadian Patent Application No. 2,756,704.
Office Action for Canadian Patent Application No. 2,756,703 dated Mar. 27, 2012.
Canadian Patent Application No. 2,756,704 Office Action dated Mar. 29, 2012.
Office Action dated Jul. 26, 2012 for Canadian Patent Application No. 2,756,703.
Copy of the Extended European Search Report mailed Apr. 19, 2012 for European patent application No. 11186210.8, 8 pages.
Freaklabs—Open Source Wireless, IEEE 802.15.4 in the context of Zigbee—Part 2, Dec. 14, 2008, 8 pages.
Non-Final Office Action for U.S. Appl. No. 13/366,094, mailed on Jan. 16, 2013, Gilles Picard, "Multiple Protocol Receiver", 5 pages.
Non-Final Office Action for U.S. Appl. No. 13/366,094, mailed on Jul. 2, 2013, Gilles Picard, "Multiple Protocol Receiver", 11 pages.
Copy of the PCT Search Report mailed Oct. 31, 2012 for PCT application No. PCT/US12/23017, 9 pages.
Wireless Medium Access Control, IEEE 802.15.4, Speaker Chun-Yi Chen, Sep. 7, 2007, 40 pages.
Yeh et al., "Software-Defined Radio for OFDM Transceivers", IEEE 2010, pp. 1-pp. 6.
Office action for U.S. Appl. No. 13/366,094, mailed on Nov. 1, 2013, Picard, "Multiple Protocol Receiver", 6 pages.
Williams, Richard "Improving Efficiency When Detecting WLAN Preambles" published 2013 UBM Electronics; retrieved from http://www.eetimes.com/document.asp?doc_id=1271968&print=yes on Jul. 29, 2013; 6 pages.
Office action for U.S. Appl. No. 13/366,094, mailed on Feb. 11, 2014, Picard, "Multiple Protocol Receiver", 13 pages.
Copy of the Australian Office Action mailed Jul. 9, 2014 for Australian patent application No. 2011379363, a counterpart foreign application of U.S. Appl. No. 13/278,412, 4 pages.
Translated copy of the Japanese Office Action mailed on Sep. 9, 2014 for Japanese patent application No. 2014-537050, a counterpart foreign application of U.S. Appl. No. 13/278,412, 9 pages.
Office Action for U.S. Appl. No. 13/278,412, mailed on Sep. 2, 2014, Vladimir Borisov, "Software-Defined Communication Unit", 12 pages.
Copy of the Australian Office Action mailed Dec. 2, 2014 for Australian patent application No. 2011379367, a counterpart foreign application of U.S. Appl. No. 13/278,421, 3 pages.
Translated copy of the Japanese Office Action mailed Jan. 13, 2015 for Japanese patent application No. 2014-537050, a counterpart foreign application of U.S. Appl. No. 13/278,412, 5 pages.
Copy of the Australian Office Action mailed May 18, 2015 for Australian patent application No. 2011379363, a counterpart foreign application of U.S. Appl. No. 13/278,412, 4 pages.
Copy of the Extended European Search Report mailed Mar. 25, 2015 for European patent application No. 11874245.1, 6 pages.
Copy the Extended European Search Report mailed Apr. 30, 2015 for European patent application No. 11874428.3, 9.
Final Office Action for U.S. Appl. No. 13/278,412, mailed on Apr. 20, 2015, Vladimir Borisov, "Software-Defined Communication Unit", 17 pages.
Prasina, et al., "Interoperability of Wireless Mesh and Wi-Fi Network Using FPGA for 4G Solutions", IEEE International Conference on Recent Trends in Information Technology, Jun. 3, 2011, pp. 491-496.
Omega Whilte Paper, et al., "Seventh Framework Programme Theme 3 Information & Communication Technologies (ICT) ICT-213311 Omega White Paper: "Inter-MAC Concept for Gbps Home Network"", Apr. 9, 2009, retrieved from the internet on Apr. 13, 2015 at http://www.ict-omega.eu/fileadmin/documents/presentations/White_Paper/Omega_White_Paper.pdf, pp. 14-25.
Translated copy of the Japanese Office Action mailed Jun. 2, 2015 for Japanese patent application No. 2014-537054, a counterpart foreign application of U.S. Appl. No. 13/278,421, 4 pages.

* cited by examiner

MULTIPLE PROTOCOL RECEIVER

FIELD OF THE SUBJECT MATTER

The presently disclosed subject matter relates to a wireless network of devices capable of exchanging information. More particularly, the presently disclosed subject matter relates to a meshed network of metrology devices with advanced metering infrastructure (AMI) capability.

BACKGROUND OF THE SUBJECT MATTER

In some instances of prior networks, a single protocol with a defined modulation technique has been used to provide communications among various network nodes. In such exemplary networks, each node generally may be configured to comply with a specific set of characteristics that make it interoperable with the other nodes of the network.

In order to transmit information among network nodes, RF packets may be sent from one node to another. Such packets generally may typically be considered to include two parts: a synchronization header and a payload that contains the data to be sent. The synchronization header is typically used to make the receiver aware that a packet is arriving and such as to let the receiver make adjustments to properly receive the data. In certain exemplary simple implementations, a synchronization header may be made up of a preamble and a synchronization word, sometimes referred to as a start of frame delimiter. For purposes of the present disclosure, the term "preamble detection" may be considered and used interchangeably with the term "synchronization header detection."

In certain of previously known networks, the receiving process can be detailed as several steps, some of them being optional, but generally including steps to detect the presence of the packet, distinguish the packet from noise or interference to avoid false alarms, recover the carrier frequency, recover the data rate, adjust the amplifier gain according to the incoming packet power, and synchronize the receiver for the reception of the first data symbol.

As a particular network evolves over time, it may be subject to occurring that new nodes can be added that are equipped with newer (or otherwise different) generation RF hardware. Such newly added nodes in some instances may be able to communicate using more sophisticated modulation techniques and protocols, resulting for example in better performance and/or data throughput. On the other hand, it's desirable that such exemplary new devices be able to communicate with the older (or preexisting) devices in order to be sure of the overall connectivity of the network. Such situations naturally (or inherently) lead to the coexistence of two or more different modulation techniques being used (or needed) over the same network. It would be advantageous, therefore, to be able to manage or otherwise handle such coexistence situations without otherwise impairing the global network performance.

Additionally, in many real-life network implementations, some nodes will have a relatively more difficult time joining the network. In certain instances, such nodes may tend to be located far away from the other nodes, thereby contributing to their inability or difficulty in joining the network. Alternatively, such nodes may be located in a basement, a shielded cabinet, or other area that may tend to attenuate RF signals. In such exemplary cases, such signal attenuation may prevent the nodes from joining the network, or may make it more difficult.

Radio links in general are known to be able to support a relatively large dynamic range, allowing communication with close neighbor nodes as well as with more relatively remote nodes. However, in a relatively larger network, some nodes may tend to nearly always be out-of-reach. One technique for addressing issues resulting in such communication problems is to use an adaptive modulation technique that adapts the data rate according to the communication link quality. Under such technique, a lower bit rate may be used to communicate with those nodes that suffer from poor link quality. Such technique can be integrated into a single protocol that uses the lowest data rate for the synchronization header and then adapts the payload data rate according to the situation per a handshake mechanism. Such techniques are known to be practiced in modem and RF technology, but such approach generally has some limitations when relatively very large data rate variations need to be spanned.

The following patent documents are examples of prior publications relating to various aspects of communications: U.S. Pat. No. 7,953,190 by Patel et al., entitled "Parallel preamble search architectures and methods;" U.S. Pat. No. 7,460,621 by Lewis, entitled "Detection;" US Application Publication No. 2011/0110229 by Himayat et al., entitled "Multi-radio communication between wireless devices;" US Application Publication No. 2011/0044395 by Hansen et al., entitled "Mixed mode preamble for MIMO wireless communications;" US Application Publication No. 2009/0310699 by Kodama et al., entitled "Communication apparatus, communication method, and integrated circuit;" and US Application Publication No. 2007/0155423 by Carmody et al., entitled "Multiprotocol wireless communication backbone." The complete disclosures of the herein referenced patent related publications are fully incorporated herein for all purposes.

Generally it can be beneficial to use a specific modulation scheme dedicated to low quality links, but such practices in general may again tend to bring about a problem of operating a wireless network with completely different modulation techniques. It would be generally advantageous, therefore, to develop a system where multiple protocols may be employed in harmony with each other to provide communications among variously located nodes within a network.

SUMMARY OF THE SUBJECT MATTER

In view of the recognized features encountered in the prior art and addressed by the presently disclosed subject matter, improved methodology and apparatus are provided for providing a multi-protocol receiver for use in radio frequency networks.

One exemplary embodiment of the presently disclosed subject matter relates to a method for receiving a packet transmission from sources using different packet transmission protocols. In certain embodiments, such an exemplary present method may comprise listening for a selected portion of multiple types of packet transmissions, identifying occurrence of a selected portion of one of the multiple types of packet transmissions, and demodulating the packet transmission based on the identified portion.

In selected further embodiments, such methodology may further involve listening for the synchronization header of a packet and in particular methods may listen for a preamble portion of a synchronization header of a packet.

In some alternative embodiments of the foregoing, present methodology may further comprise associating a predetermined modulation technique with the identified selected portion of the packet transmission.

Yet another exemplary embodiment of the presently disclosed subject matter may relate to a method for exchanging information in a network formed from multiple nodes. Such method may comprise transmitting a packet from a node using one of multiple packet protocols, listening for a selected portion of the transmitted packet, identifying occurrence of a selected portion of one of the multiple packet protocols within the transmitted packet, and demodulating the packet based on the identified portion.

In selected of such present methodology embodiments, packets may be transmitted using a single radio frequency for each of the multiple packet protocols and in some instances listening may be performed using a narrow bandwidth receiver, the bandwidth of which is based on the widest bandwidth used by the multiple packet protocols.

In further alternative present embodiments, packets may be transmitted using a frequency hopping system wherein the same frequency hopping pattern is used for each of the multiple packet protocols.

Those of ordinary skill in the art should understand that the presently disclosed subject matter equally relates to both methodology and to corresponding and related apparatus subject matter. For example, one further present exemplary embodiment of the presently disclosed subject matter relates to a packet receiver including a radio frequency front end, a baseband processor, and a synchronization header detector. In exemplary such receivers, the synchronization header detector may be configured to listen for multiple packet protocols and to identify occurrence of a selected portion of a packet transmitted under one of the multiple packet protocols. In such exemplary receivers, the baseband processor may also be configured to process a received packet based on a single modulation technique at a time.

In some present exemplary embodiments, the receiver's front end may be configured to receive transmissions on a single frequency while in other present exemplary embodiments the front end may be a frequency hopping receiver.

In yet further present alternative embodiments, the foregoing exemplary baseband processor may be configured to process with a modulation technique determined based on packet protocol identification performed by the synchronization header detector.

In some alternative uses of the present subject matter, at least some of the nodes may be associated with metrology devices, and the presently disclosed network subject matter may be implemented as a meshed network of metrology devices. In other present alternatives, the presently disclosed packet receiver may be used in a meshed network of metrology devices. In a utility industry setting, the nodes may include endpoints, meters, cellular relays, routers, transformers, substations, servers and head offices, for example. While techniques are described herein in the context of a utility network, the techniques are also applicable to other types of networks as well, such as, for example, telecommunications networks, sensor networks, and the like. In the context of other networks, nodes may include servers, computers, routers, switches, sensors, or any other device coupled to any type of network.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Figure 1:
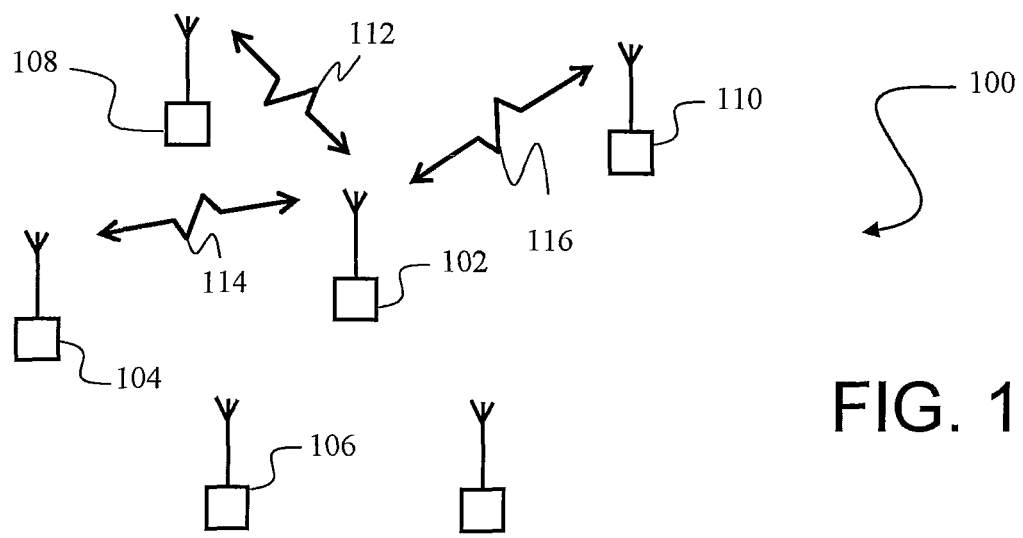
FIG. 1 is a block diagram illustrating an exemplary radio frequency (RF) network constructed using certain embodiments of the presently disclosed technology.

Repeat use of reference characters throughout the present specification and appended drawings is intended to represent same or analogous features, elements, or steps of the presently disclosed subject matter.

DETAILED DESCRIPTION OF THE SUBJECT MATTER

As referenced in the above Summary section, the presently disclosed subject matter is particularly concerned with providing in some embodiments thereof a multiple protocol receiver. In an evolving network, for example an evolving mesh network, with different generations of hardware, relatively newly developed nodes are able to communicate using sophisticated modulation techniques and protocols. Such nodes are able to provide better performance and data throughput, while still communicating with older devices. Through the use of embodiments of the presently disclosed subject matter, coexistence of different types of node devices is managed without impairing the performance of the global network.

Additionally, the presently disclosed subject matter permits the use of adaptive modulation techniques to receive hard to reach nodes at low data rates, while continuing to communicate at higher data rates with other easier to reach nodes. Such techniques also allow very large data rate variations where one modulation technique with a common preamble at the lowest data rate would not be efficient.

In general, such benefits are achieved in accordance with embodiments of the presently disclosed subject matter by providing a multi-protocol receiver that is configured to share a single analog radio frequency (RF) and employ a digital processor to provide parallel preamble detection, but which is configured to revert to a single modulation technique once a particular modulation has been detected.

With initial reference to FIG. 1, there is illustrated a block diagram of an exemplary radio frequency (RF) network generally 100 constructed using embodiments of the presently disclosed technology. Exemplary network 100 may be inhomogeneous such that the nodes 102, 104, 106, 108, 110 of network 100 may have different radio transceivers with different performance characteristics, while the RF links 112, 114, 116 between the nodes may also greatly vary in link quality for each pair of nodes. In some present alternatives, at least some of the nodes may be representative of nodes associated with metrology devices, and the network may comprise a meshed network of metrology devices. Although the presently disclosed material has application in Smart Grid and advanced metering infrastructure (AMI) networks and related, the concepts are equally applicable in more general communication networks which can benefit in a similar fashion as presently disclosed.

Figure 2:
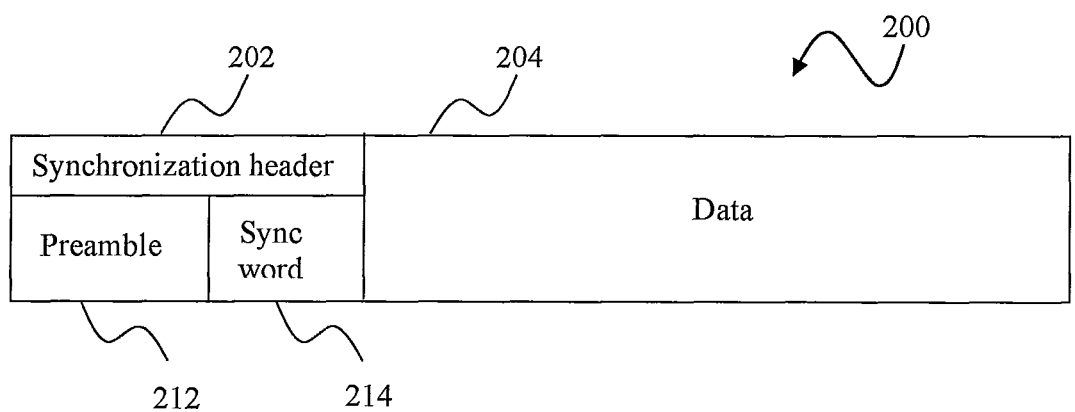
FIG. 2 diagrammatically illustrates an exemplary packet structure used in certain embodiments of the presently disclosed technology.

With present reference to subject FIG. 2, there is diagramatically illustrated an exemplary packet structure generally 200 as may be used in embodiments of the presently disclosed technology. As illustrated, packet structure 200 corresponds to a synchronization header 202 and a data portion 204. Synchronization header 202 in the exemplary embodiment shown is preferably made up of a preamble and a synchronization word. As will be understood by those of ordinary skill in the art from the complete disclosure herewith, the preamble portion of synchronization header 202 is intended to be varied, based on the various transmission protocols used by the various respective network nodes 102, 104, 106, 108, and 110.

In accordance with embodiments of the presently disclosed subject matter, a receiver is provided that listens for multiple preambles to identify when different types of such preambles, and correspondingly, different types of synchronization headers 202, are detected.

Figure 3:
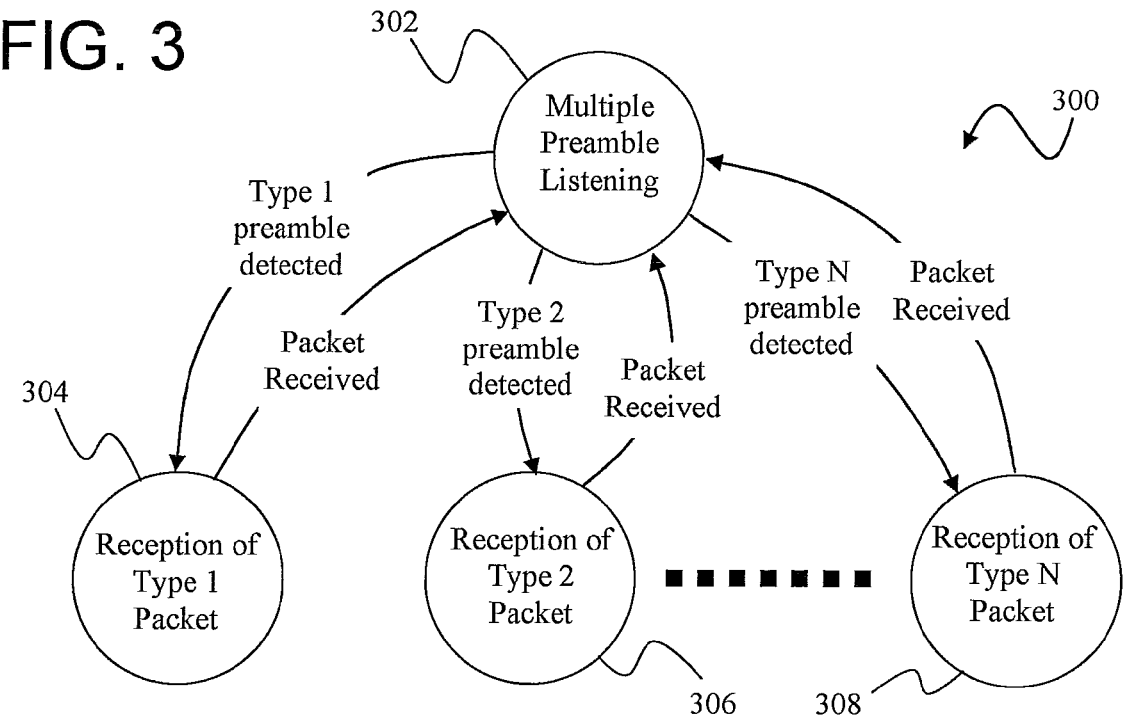
FIG. 3 diagrammatically presents an exemplary multiple protocol receiver state machine as may be employed in the implementation of selected embodiments of the presently disclosed technology.

With present reference to FIG. 3, there is diagrammatically illustrated an exemplary multiple protocol receiver state machine 300 as may be employed in the implementation of selected embodiments of the presently disclosed technology. While a brute force approach to the problem of listening for multiple preambles might be to use several transceivers in each respective node (with one transceiver for each modulation technique or protocol that one would want the network to support), such an approach would lead to prohibitive cost and poor integration of the different protocols.

In contrast, and in accordance with embodiments of the presently disclosed subject matter, a multiple protocol receiver is provided. One exemplary embodiment of a receiver constructed in accordance with the presently disclosed subject matter may be described by a representative state machine generally 300 as illustrated in FIG. 3. The basic operation of a multi-protocol receiver assumes that each one of the modulation techniques or protocols to be supported uses a specific preamble. Identification of such specific preambles facilitates distinguishing the modulation technique used.

With further reference to FIG. 3 and representative state machine generally 300, it will be noticed that in its idle state the receiver is listening simultaneously at state 302 for the different respective preambles of the supported protocols. Once a known preamble is detected, the receiver switches to reception of the corresponding modulation. After completion of the packet reception, or in case of failure, the receiver switches back to simultaneous listening for preambles.

Thus, for example, while state machine 300 is in state 302, where it is listening for multiple supported preambles, if for example a preamble of a first type is detected, the state machine transitions to state 304 where the receiver switches to reception of the first type packet. When a first type packet is received, the state machine may transition back to the multiple preamble listen state 302.

In similar fashion, if a second type preamble is detected, state machine 300 may transition to reception of the second type packet at state 306, or if an N type preamble is detected may transition to state 308 for reception of an N type packet. It will be appreciated that any number of receptions of various type packet states (as representatively shown as states 304, 306, and 308) many be provided.

Figure 4:
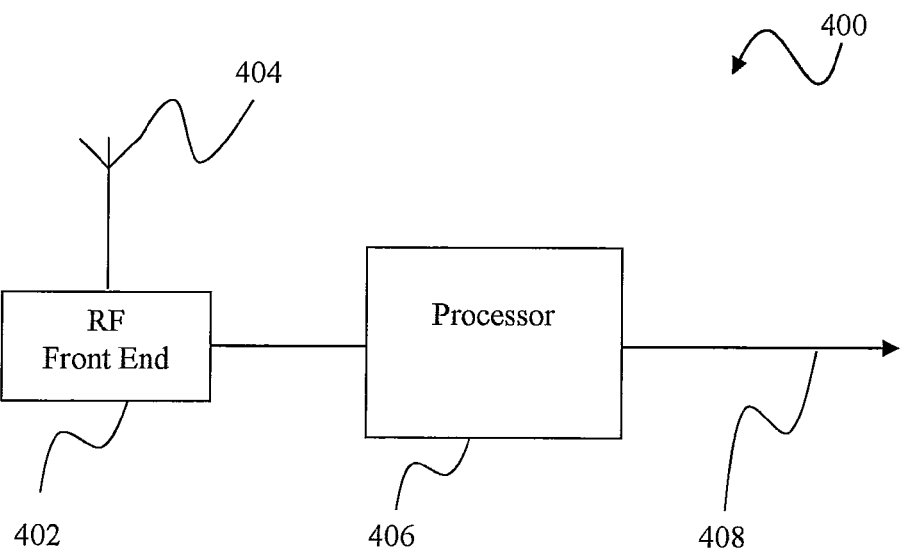
FIG. 4 is a block diagram of an exemplary multi-protocol receiver constructed in accordance with an embodiment of the presently disclosed subject matter.

With present reference to FIG. 4 there is illustrateds a block diagram of a representative exemplary multi-protocol receiver generally 400 constructed in accordance with an exemplary embodiment of the presently disclosed subject matter. Receiver 400 may include an RF Front End 402 coupled to antenna 404 and configured to receive radio frequency signals as may be transmitted within a network from a node. In certain present exemplary embodiments, RF Front End 402 may be configured to receive a single frequency radio frequency signal that may be common to each node within a network. In other embodiments, representative RF Front End 402 may be configured as a frequency hopping system but also may be designed to use the same frequency hopping pattern for all transmission protocols.

Representative processor 406 is configured to listen for multiple different headers transmitted as a portion of packets from multiple different devices using multiple different packet protocol. In an exemplary configuration, processor 406 may employ a synchronization header detector process to detect the presence of one of such multiple different headers. Upon detection of such header, such information is passed to an exemplary representative baseband processor corresponding to an additional process performed by processor 406 in accordance with the presently disclosed subject matter.

In some embodiments of the presently disclosed subject matter, the synchronization header detector process performed by processor 406 may be configured to listen for only a preamble portion of the synchronization header transmitted by the various network nodes.

In accordance with the various packet protocols, the preamble portion of the synchronization header may be configured to identify the type of modulation technique being used by the particular node for the particular packet being transmitted. The modulation technique may take into consideration various transmission rates so as to provide, for example, a slower transmission rate for hard to reach nodes, in order to maintain transmission link quality. In other embodiments of the presently disclosed technology, the transmission rate may be relatively higher so as to relatively increase the transmitted data rate when the nodes are easier to reach due to their relatively close proximity to a receiving or transmitting communication paired node or because of a relatively unobstructed transmission path that has not significantly attenuated the signal between communicating nodes.

Following detection of the synchronization header, or at least the preamble portion thereof (either of which are in accordance with the presently disclosed subject matter), signals passed to the baseband processor may then be demodulated and supplied to an output line 408 for use in network related communications. Significantly, in accordance with the presently disclosed subject matter, the baseband processing aspects of processor 406 requires less processing capability than the synchronization header detector aspects. Such advantageous characteristic flows from the fact that the synchronization header detector process is tasked with listening for multiple protocols concurrently, that is, in parallel, while baseband processing need only process signals based on a single modulation technique at any one time.

Those of ordinary skill in the art will appreciate that the various components of representative multi-protocol receiver 400 may be embodied in hardware, software, and/or combinations thereof. For example, the representative RF front end 402 may correspond to a hardware device while the synchronous header detection and baseband processing may both be provided via software programming of a processor, or general purpose computer, or firmware controlled controller or microprocessor, or any other device that may be used to implement signal processing functions.

A number of significant benefits derive from embodiments of the presently disclosed subject matter, which include but are not limited to the following examples. First, the RF analog front end 402 for the receiver 400 is common to all modulation types. Secondly, the baseband processing function only needs to handle one modulation at a time when a packet needs to be demodulated. Such feature is especially beneficial for a software defined radio as the maximum required computation power is drastically reduced. Thirdly, detection of only the preamble portion of the various synchronization headers actually needs to be performed in parallel. Such operation requires much less processing power than the complete demodulation and decoding of monitored packets.

The benefits of embodiments of the presently disclosed subject matter are in many embodiments significantly enhanced if the different protocols use the same channel center frequency. In such cases, the receiver bandwidth can be as narrow as the widest bandwidth used in the different protocols. In a frequency hopping system, similar enhancements may be achieved by using the same frequency hopping pattern for all the protocols.

Figure 5:
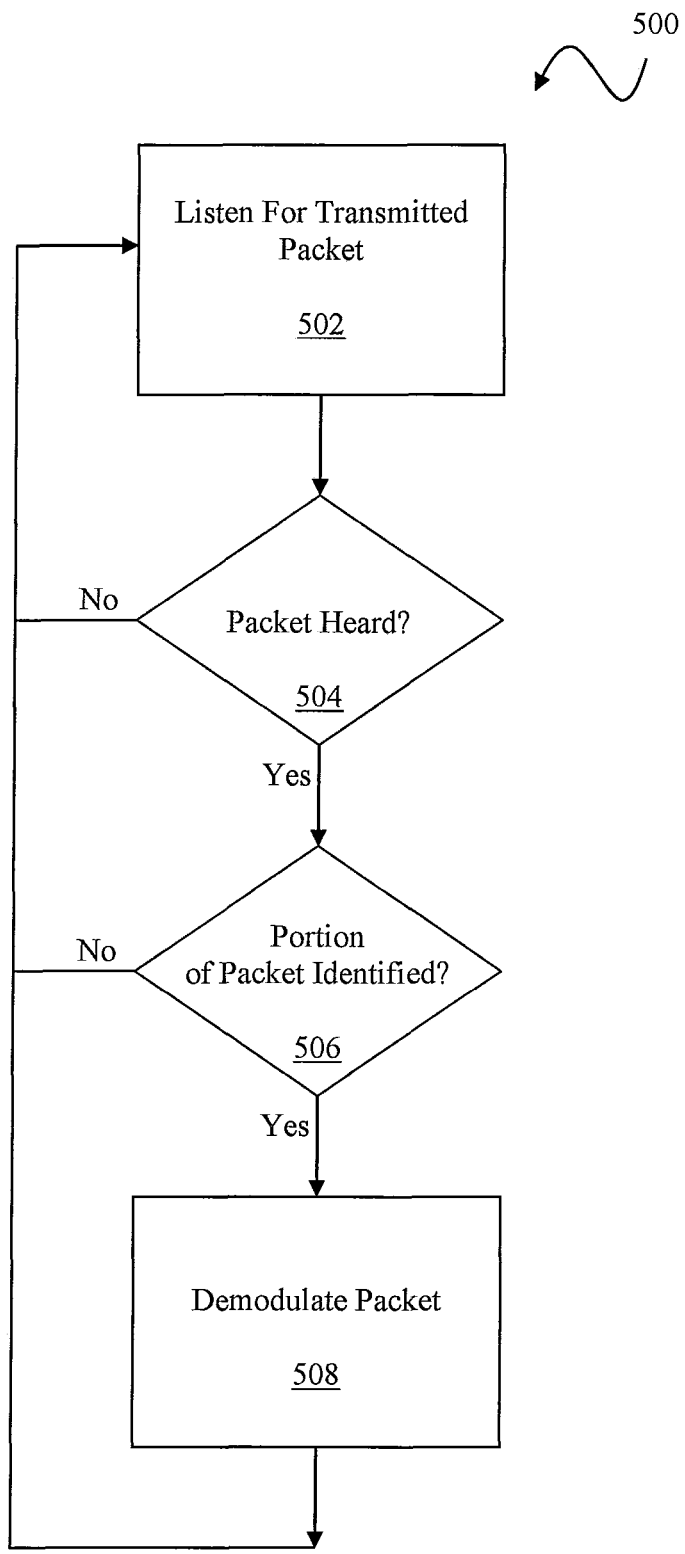
FIG. 5 is a flow chart illustrating methodologies for demodulating packets in accordance with embodiments of the presently disclosed subject matter.

With present reference to FIG. 5 there is illustrated a flow chart 500 illustrating methodologies for demodulating packets in accordance with embodiments of the presently disclosed subject matter. As may be seen in FIG. 5, a receiver may be configured to listen (step 502) for transmitted packets. If a packet is heard (step 504), a determination is made (step 506) as to whether at least a portion of the packet can be identified. Primarily, as previously noted, an examination of received packets is performed at step 506 by employing a multiple protocol receiver to listen to and examine received packets based on such multiple protocols in a parallel fashion. When a packet is identified (step 506), the entire packet may then be demodulated (step 508) based on the identified packet. In accordance with a further feature of the present methodology, packet identification step 506 may be arranged to listen to only a portion, preferably the preamble portion, of the packet to effect identification of the packet transmission protocol. Further still, once a portion of a packet is identified in step 506, further packets may be automatically demodulated using the identified protocol at least for the completion of the packet reception or until there is a failure in reception. In case of such a failure, the methodology will revert to a listen mode at step 502 and revert to a multiple simultaneous protocol listening/identifying state.

While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. A method for receiving a packet from sources using different packet transmission protocols, comprising:
   receiving packets until a packet having a known preamble is received, wherein the receiving comprises parallel processing that concurrently seeks to detect each of a plurality of different preambles associated with a plurality of known modulation techniques, respectively, within each of the received packets;
   identifying a modulation technique from among the plurality of known modulation techniques, wherein the identifying is based at least in part on the known preamble of the received packet; and
   demodulating the received packet based on the identified modulation technique, wherein the demodulating is performed within a state selected from among a plurality of states, each of the plurality of states associated with a respective modulation technique;
   wherein each of the plurality of known modulation techniques utilizes a same frequency hopping pattern.

2. The method as in claim 1, wherein the known preamble is part of a synchronization header of the received packet.

3. The method as in claim 1, wherein the packets received are received within an inhomogeneous network, and wherein within the inhomogeneous network at least some of the plurality of different preambles are sent by nodes associated with metrology devices in a smart electrical grid and at least some of the plurality of different preambles are sent by nodes not associated with metrology devices.

4. The method as in claim 1, wherein:
   the identifying comprises recognizing a transmission protocol; and
   the demodulating uses the recognized transmission protocol.

5. The method as in claim 1, wherein:
   the received packets are received on a single radio frequency used by all devices on a network.

6. The method as in claim 1, wherein:
   the received plurality of packets are received on a plurality of frequencies according to a single frequency hopping technique used by all devices on a network.

7. A method for receiving information, comprising:
   receiving a plurality of packets from a plurality of different nodes operating within an inhomogeneous network, the plurality of received packets each having one of a plurality of different preambles indicating a plurality of different modulation techniques, wherein the receiving comprises parallel processing that concurrently seeks to detect each of the plurality of different preambles according to each of the plurality of different modulation techniques, respectively, and wherein a same frequency hopping pattern is used with each of the plurality of different modulation techniques;

identifying a modulation technique of a received preamble of a received packet from among the plurality of received packets according to operation of a first state of a state machine operated on a node, wherein the identified modulation technique is from among the plurality of different modulation techniques; and demodulating, in a second state of the state machine, the received packet based on the identified modulation technique.

8. The method as in claim 7, wherein receiving the plurality of packets comprises use of a narrow bandwidth receiver whose bandwidth is based at least in part on bandwidth used by the plurality of different modulation techniques.

9. The method as in claim 7, wherein the received preamble is at least part of a synchronization header of the received packet.

10. The method as in claim 7, wherein the inhomogeneous network comprises a mesh network of nodes associated with metrology devices.

11. A packet receiver, comprising:
a radio frequency front end configured for frequency hopping;
a baseband processor, in communication with the radio frequency front end; and
a synchronization header detector configured to detect a packet having a known preamble, wherein the detecting comprises parallel processing that concurrently seeks to detect each of a plurality of different preambles associated with each of a plurality of different transmission protocols within each of a plurality of received packets, wherein a single frequency hopping pattern is used by the radio frequency front end for each of the plurality of different transmission protocols.

12. The receiver as in claim 11, wherein said baseband processor is configured to process with a modulation technique determined based on packet protocol identification performed by said synchronization header detector.

13. The receiver as in claim 11, wherein said baseband processor and said synchronization header detector comprise software running on a processor.

14. The receiver as in claim 11, wherein said synchronization header detector comprises part of said baseband processor.

15. The receiver as in claim 11, combined with a meshed network for metrology devices.

16. The receiver as in claim 11, wherein the radio frequency front end and the baseband processor comprise a combination of hardware and software.

* * * * *